UNITED STATES PATENT OFFICE.

GEORGE D. BURTON, OF BOSTON, MASSACHUSETTS.

PROCESS OF TREATING AND DEGUMMING POROUS AND FIBROUS SUBSTANCES.

No. 870,157. Specification of Letters Patent. Patented Nov. 5, 1907.

Application filed September 21, 1906. Serial No. 335,592.

*To all whom it may concern:*

Be it known that I, GEORGE DEXTER BURTON, a citizen of the United States of America, residing at Boston, county of Suffolk, in the State of Massachusetts, have invented certain new and useful improvements relating to the process of treating all kinds of porous and fibrous substances, such as the barks of trees, the leaves of plants, all kinds of grasses, the woods of all kinds of trees, straw, hemp, jute, ramie, flax, and all substances of a vegetable or fibrous nature.

The object of the invention is to provide a simple, convenient and economical system for the purpose of treating the leaves of plants, shrubs, the barks of trees, the stems or stalks of fibrous shrubs or plants, &c. for the purpose of softening the same, so that the gum or gummy substances, acid, gases or coloring matter may be removed therefrom, and, if desired, collected and saved.

Another object of the invention is to soften the gummy material or substance contained in porous or fibrous substances, so that the same may be subjected to further treatment such as will make such substances commercially useful in the arts.

Another object of this invention is to provide a simple and efficient means whereby such treatment may be economically and safely carried on.

Another object of the invention consists in providing a suitable apparatus for carrying out this invention, which consists of a tank or receptacle composed of wood, porcelain, metal lined with porcelain, or any other suitable material known in the arts.

Another feature of this invention consists in providing a suitable solution by which the porous or fibrous materials may be easily and properly softened, so that that portion which it is desired to eliminate from whatever substance it is desired to treat shall be acted upon quickly to produce the required results.

My invention consists further in providing any suitable tank, vat or other receptacle, into which may be placed an acidulated solution composed of water, acids or chemical salts, such as a solution composed of water and sulfuric acid, or water and acetic acid, having a specific gravity varying from 1.001 to 1.020 more or less, according to the size of the receptacle and the amount of material it is desired to treat at one operation. The chemical salts may consist of chlorid of sodium, sodium carbonate or any other chemical salts, known in the arts, or any other suitable acids.

I will now describe the operation of the invention, which consists in first providing a suitable receptacle into which a coil of pipe may be arranged in any convenient manner for the purpose of emitting steam or hot water to said receptacle for the purpose of heating the solution to any desired temperature up to the point of boiling. The receptacle will contain the watery or acidulated or alkaline solution and into this receptacle the leaves, grasses, plants, barks, woods, straws or other porous or fibrous material is placed and allowed to remain sufficiently long to soften the gum and such other substances as are in the material desired to be treated, and, when the same have become properly softened and the gummy substance has been sufficiently treated to eliminate some or all of the gum therefrom, the material is then removed from the treating substance and passed through a series of rolls, which may be attached to the tank, or arranged separately therefrom, or in any suitable manner. These rolls are for the purpose of squeezing or rolling or pressing out the solution and also the gum or other substance and at the same time break up the fiber contained in the material being treated. These rolls have a tendency to separate and keep the fiber straight and make it soft and pliable. These rolls may be composed of wood, porcelain, or wood covered with rubber, or rubber or any suitable metal or any material found necessary for the purposes herein referred to. These rolls may be arranged one on top of the other, or in several pairs, or in series, or in any suitable manner. These rolls may be smooth-faced or corrugated or any other shape, and may be operated by hand or power or in any well-known manner. The solution instead of being heated by steam may be heated by electricity or in any other way. A suitable inlet pipe for conducting the solution to the tank or receptacle may be conveniently arranged and a suitable outlet pipe may be placed in said tank or vat in any suitable manner for the purpose of withdrawing the solution after it has been used for treatment. Said tank or other receptacle may be connected to other tanks in any well known manner or otherwise, so that the solution can be drawn into another tank after it has been used and may also be connected to other tanks for the purpose of letting in a stronger solution, or for the purpose of strengthening the solution in the treating tank.

After having given a great deal of time to experimenting upon the fibers and fibrous properties of different plants, leaves, roots, barks, straw, stems, grasses, &c. from various parts of the world, I find that my process is a very efficient and economical method of handling the same for the purpose of eliminating the gum or gummy substance and recovering the fibrous substance in such leaves, stalks, bark, plants, grasses, etc.

After the treatment herein described has been carried out, the fibrous material from the substances having been treated may be placed in bundles, fastened or tied together and then placed in a revolving apparatus, or in any other suitable receptacle for the purpose of washing or cleansing the same if found necessary. Sometimes it is desirable to bleach the product after it has been recovered in the manner herein described and when it is found necessary to do so I subject such material to a bleaching process which may consist in placing the fibrous substances in another receptacle and adding a watery bleaching solution composed of water and oxalic acid of a specific gravity of about 1.005 to 1.015, more or less. Another good bleaching solution may consist of water, castile soap and oxalic acid of a specific gravity varying from 1.003 to 1.015, more or less, according to the size of the receptacle and the quantity of material contained therein. This solution may be heated by steam, electricity, or in any other manner known in the arts or trades. I have found a degree of temperature varying from 160 to 200 degrees Fahrenheit best adapted to this purpose, although I do not wish to confine myself to any specific degree of heat. Another satisfactory solution for softening the fibrous substances may consist of a watery solution of acetic acid of a density of 1.003 to 1.015, more or less. Then I withdraw the leaves, bark, fibrous substances or grasses from this solution and subject them to a five per cent solution more or less of caustic soda or soda ash or its equivalent and bring the solution up to the boiling point, and then wash the substance treated in warm water to which sufficient oxalic acid and castile soap are added to make a 5% solution more or less to cause a further bleaching and cleansing effect. Any saponaceous solution is effective to a more or less extent.

If it is desired, I may heat the rolls through which the material is to be passed by steam, gas, electricity or by any of the well known methods in the art of heating rolls in operation or otherwise. As this is a process application for patent and as all the mechanical elements are well known both in the trade and the arts I do not deem it necessary to further describe or show any specific construction of apparatus.

I claim as my invention:

1. The process of treating porous and fibrous substances for the purposes of softening, degumming, and separating the same, which consists in immersing said substances in a bath containing a suitable softening agent, heating said bath while the substances are immersed therein, and then subjecting said substances to roller pressure.

2. The process of treating porous and fibrous substances for the purpose of softening, degumming, and separating the same, which consists in immersing said substances in a bath containing a suitable softening agent, and then subjecting said substances to roller pressure.

3. The process of treating porous and fibrous substances for the purpose of softening, degumming, and separating the same, which consists in immersing said substances in a bath containing a suitable softening agent, then subjecting said substances to roller pressure, and then washing the same in a suitable cleansing solution.

4. The process of treating porous and fibrous substances for the purpose of softening, degumming, and separating the same, which consists in immersing said substances in a bath containing a suitable softening agent, then subjecting said substances to roller pressure, and then washing the same in warm water containing oxalic acid.

5. The process of treating porous and fibrous substances for the purpose of softening, degumming, and separating the same, which consists in immersing said substances in a bath containing a suitable softening agent, then subjecting said substances to roller pressure, and then washing the same in warm water containing oxalic acid and castile soap.

6. The process of treating porous and fibrous substances for the purpose of softening, degumming, and separating the same, which consists in immersing said substances in a bath containing a suitable softening agent, then subjecting said substances to roller pressure, and then washing the same in a saponaceous solution containing oxalic acid.

7. The process of treating porous and fibrous substances for the purpose of softening, degumming, and separating the same, which consists in immersing said substances in a bath containing a suitable softening acid, then subjecting said substances to roller pressure, and then washing the same in a saponaceous solution containing oxalic acid.

8. The process of treating porous and fibrous substances for the purpose of softening, degumming, and separating the same, which consists in immersing said substances in a bath containing a suitable softening agent, heating said bath while the substances are immersed therein, then subjecting said substances to roller pressure, and then washing the substances in a suitable cleansing solution.

In witness whereof, I have hereunto set my hand and seal this 4th day of August, 1906.

GEO. D. BURTON. [L. S.]

Witnesses:
CHARLES C. DODGE,
J. B. CROSBY.